United States Patent [19]
Sato et al.

[11] Patent Number: 5,293,284
[45] Date of Patent: Mar. 8, 1994

[54] CASSETTE AUTOCHANGER

[75] Inventors: Keiji Sato; Hideaki Noguchi, both of Kanagawa, Japan

[73] Assignee: Sony Corporation, Tokyo, Japan

[21] Appl. No.: 897,045

[22] Filed: Jun. 11, 1992

[30] Foreign Application Priority Data

Jun. 17, 1991 [JP] Japan ................. 3-144346

[51] Int. Cl.⁵ ............................................. G11B 15/68
[52] U.S. Cl. .................... 360/92; 360/98.04; 369/34
[58] Field of Search ............ 360/92, 98.04, 98.06; 369/34

[56] References Cited

U.S. PATENT DOCUMENTS

| 4,504,936 | 3/1985 | Faber et al. | 369/34 |
| 4,675,856 | 6/1987 | Rudy et al. | 369/34 |
| 4,903,252 | 2/1990 | Tawaka et al. | 360/98.06 |

FOREIGN PATENT DOCUMENTS

| 3500666 | 7/1986 | Fed. Rep. of Germany | 360/92 |
| 0239370 | 10/1987 | Japan | 360/72 |

*Primary Examiner*—Thomas E. Denion
*Attorney, Agent, or Firm*—William S. Frommer; Alvin Sinderbrand

[57] ABSTRACT

A cassette autochanger comprising a cassette container for containing a plurality of cassettes placed in a vertical posture, a reproducing unit for reproducing the signal recorded on the medium of one the cassettes placed therein in a horizontal posture, and a cassette holder movable between vertical and horizontal postures for receiving a selected one of the cassettes thereinto from the cassette container or from the reproducing unit and for transferring the selected cassette therefrom into the cassette container or into the reproducing unit. A carrying device is provided for carrying the cassette holder between the cassette container and the reproducing unit. The carrying device changes the cassette holder from the horizontal posture into the vertical posture to permit the cassette holder to receive the selected cassette from the cassette container or transfer the selected cassette into the cassette container. The carrying device changes the cassette holder from the vertical posture into the horizontal posture to permit the cassette holder to receive the selected cassette from the reproducing unit or transfer the selected cassette into the reproducing unit.

6 Claims, 8 Drawing Sheets

CASSETTE AUTOCHANGER

BACKGROUND OF THE INVENTION

This invention relates to a cassette autochanger suitable for use in a continuous reproduction over achieving long period of time with a number of tape cassettes being selectively transferred in a desired sequence between a cassette container and a video tape recorder.

For example, Japanese Patent Kokai No. 62-241180 discloses a conventional video tape cassette autochanger of this type which includes a plurality of video tape players arranged to reproduce video tape cassettes placed therein in a horizontal posture and cassette containers arranged to contain a number of video tape cassettes placed in a horizontal posture. Such a conventional cassette autochanger is operable with a simple structure for carrying a video tape cassette between one of the tape containers and one of the video tape players. However, the video tapes have their longitudinal edges at one side of the tape held in pressure contact with the respective cassette casings during storage and, because of weight of the wound tape, the tape is damaged when preserved for a long period of time. This is true particularly for cassette autochangers where a number of video tape cassettes are preserved in the cassette containers over a very long period of time. Thus, the conventional cassette autochanger is not suitable for a long-term cassette preservation. A similar discussion is applied to various kinds of tape cassettes other than video tape cassettes.

SUMMARY OF THE INVENTION

A main object of the invention is to provide an improved cassette autochanger which can preserve tape cassettes for a long period of time without the danger of damaging the tapes contained in the respective cassettes.

There is provided, in accordance with the invention, a tape cassette autochanger comprising at least one cassette container for containing a plurality of tape cassettes placed in a vertical posture. Each of said cassettes has a tape medium on which a signal is recorded. The cassette autochanger also includes at least one reproducing unit for reproducing the signal recorded on the tape medium of one of said cassettes placed therein in a horizontal posture, and a cassette holder movable between vertical and horizontal postures for receiving a selected one of said tape cassettes thereinto from said cassette container or from said reproducing unit and for transferring the selected cassette therefrom into said cassette container or into said reproducing unit. A carrying device is provided for carrying said cassette holder between said cassette container and said reproducing unit. The carrying device includes means for changing said cassette holder from the horizontal posture into the vertical posture to permit said cassette holder to receive the selected cassette from said cassette container or to transfer the selected cassette into said cassette container and for changing said cassette holder from the vertical posture into the horizontal posture to permit said cassette holder to receive the selected cassette from said reproducing unit or to transfer the selected cassette into said reproducing unit.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
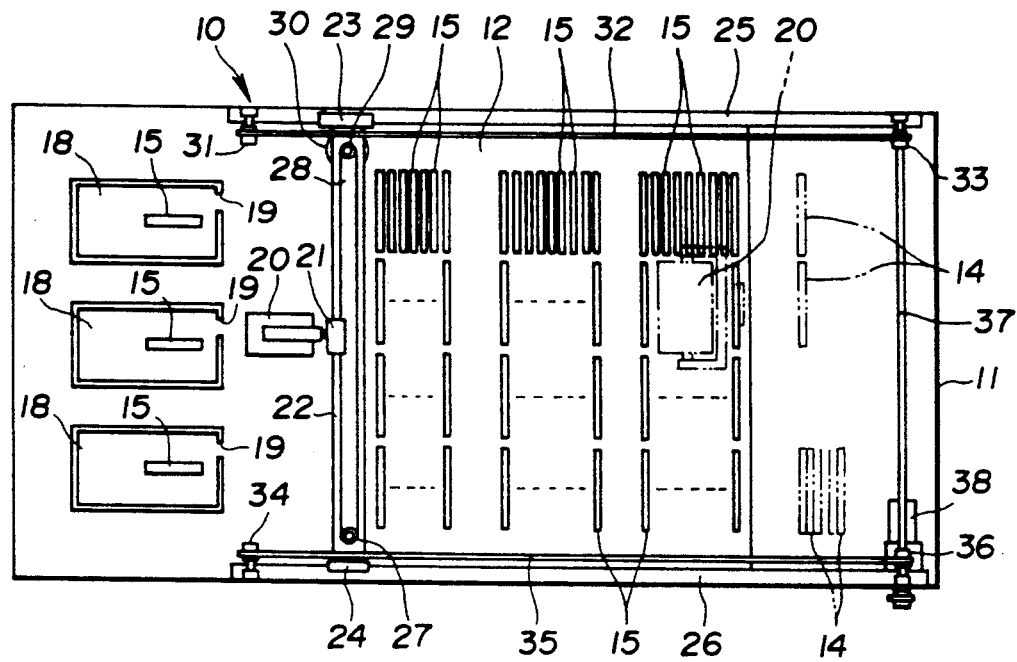
FIG. 1 is an elevational view showing one embodiment of a cassette autochanger made in accordance with the invention.
Figure 2:
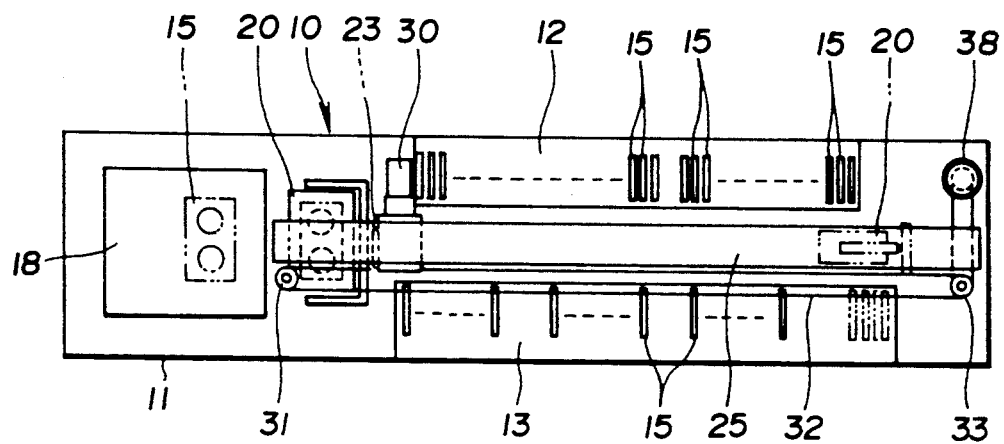
FIG. 2 is a plan view of the cassette autochanger of FIG. 1.
Figure 3:
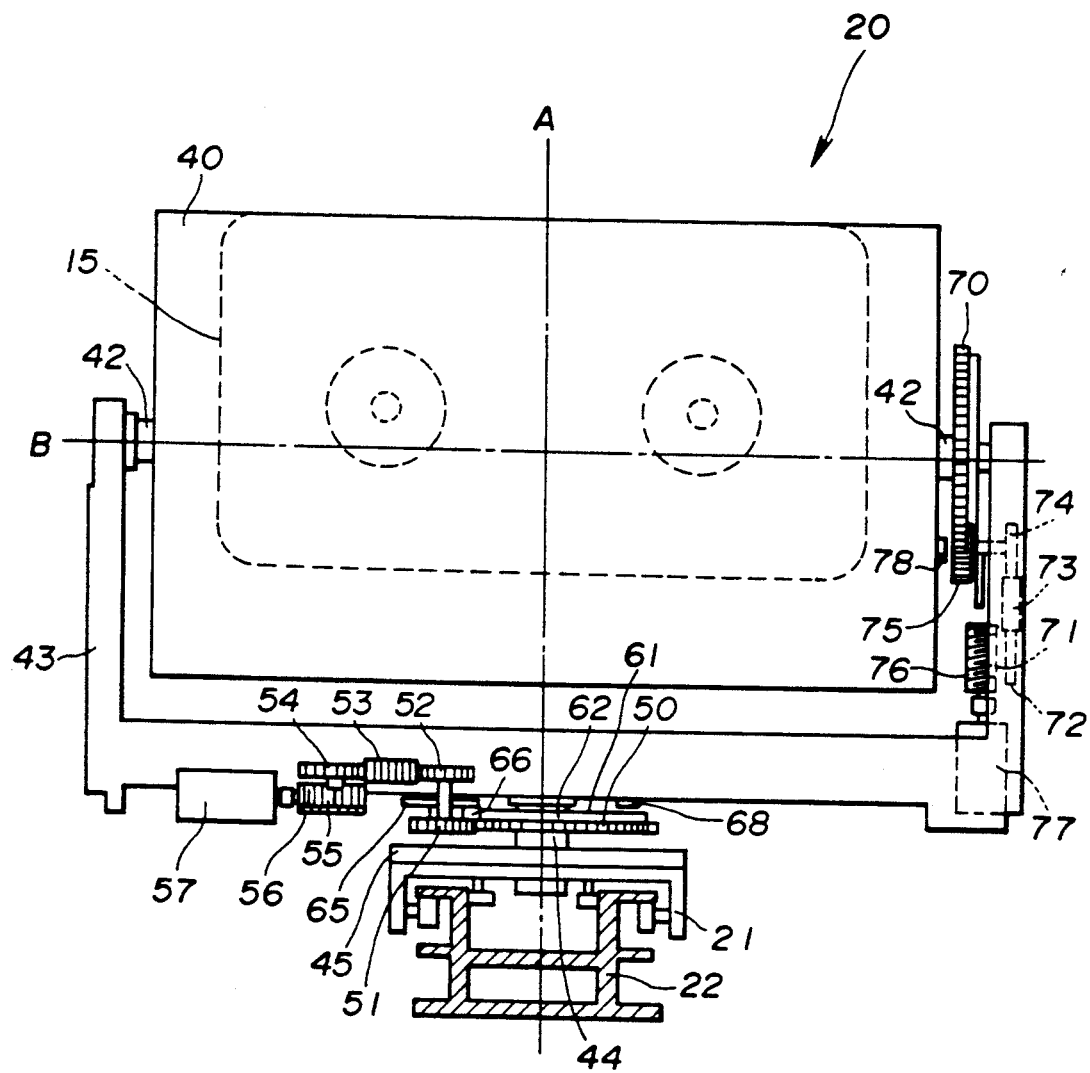
FIG. 3 is an enlarged plan view showing the tape cassette holder used in the cassette autochanger of FIG. 1.
Figure 4:
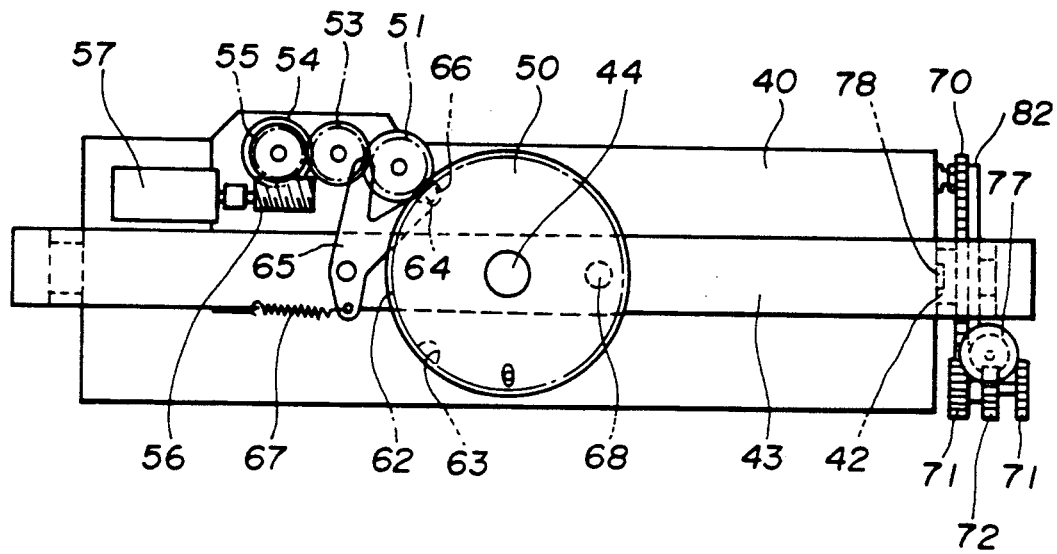
FIG. 4 is a rear view of the tape cassette holder.
Figure 5:
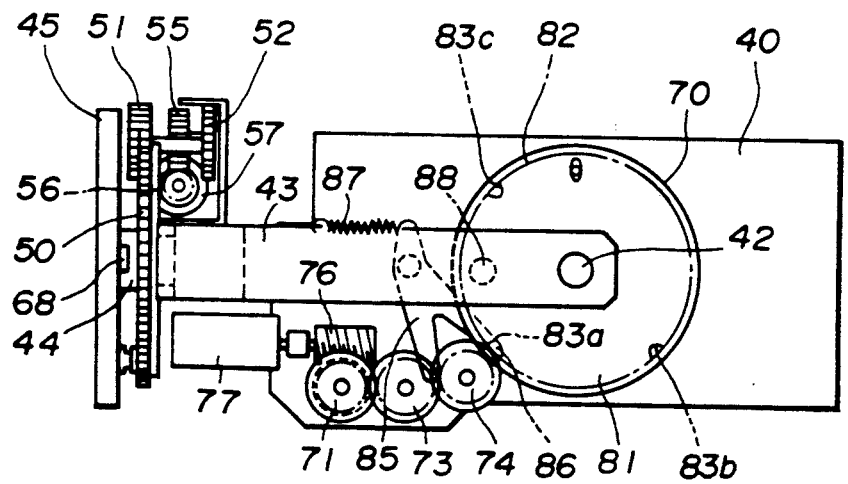
FIG. 5 is a side view of the tape cassette holder.

With reference to the drawings, wherein like numerals refer to like parts in the several views, and in particular to FIGS. 1 and 2, there is shown a tape cassette autochanger embodying the invention. The tape cassette autochanger, generally designated by the numeral 10, includes a housing 11 which contains two tape cassette containers 12 and 13 positioned in spaced parallel relation to each other. Each of the tape cassette containers 12 and 13 is shown as having a number of bins for containing a number of tape cassettes 15 placed therein in a vertical posture, and a number of vertically elongated rectangular ports 14 through which the respective tape cassettes 15 are placed into and drawn out of the tape cassette container. The housing 11 also contains a plurality of (in illustrated case three) tape recorder/player units 18 spaced in the vertical direction. Each of the tape recorder/player units 18 has a horizontally elongated rectangular cassette port 19 through which a tape cassette 15 is placed into and out of the tape recorder/player unit. The tape recorder/player unit 18 performs recording or reproducing for a tape cassette 15 positioned in a horizontal posture within the tape recorder/player unit.

A tape cassette carrier 20 is supported on a slider 21 which is slidable along a vertical guide rail 22. The vertical guide rail 22 is provided at its opposite ends with sliders 23 and 24 secured thereto. The sliders 23 and 24 are slidable along upper and lower horizontal guide rails 25 and 26, respectively. The upper guide rail 25 may be mounted on the ceiling of the housing 11, and the lower guide rail 26 may be mounted on the floor of the housing 11. The tape cassette carrier 20 is moved in vertical and horizontal directions in the space defined between the tape cassette containers 12 and 13.

To produce the upward and downward motion of the tape cassette carrier 20 along the vertical guide rail 22, the vertical guide rail 22 is provided at its lower end with a pulley 27 around which a drive belt 28 extends. The drive belt 28 also loops about a pulley 29 fixed at the upper end of the vertical guide rail 22 to the output shaft of a drive motor 30. The opposite ends of the drive belt 28 are fixed on the opposite sides of the slider 21 on which the tape cassette carrier 20 is supported. To produce the leftward and rightward motion of the tape cassette carrier 20 between the horizontal guide rails 25 and 26, the horizontal upper guide rail 25 is provided at its one end with a pulley 31 around which a drive belt 32 extends. The drive belt 32 also loops about a pulley 33 fixed at the other end of the horizontal upper guide rail 25. The opposite ends of the drive belt 32 are fixed on the opposite sides of the slider 23. Similarly, the horizontal lower guide rail 26 is provided at its one end with a pulley 34 around which a drive belt 35 extends. The drive belt 35 also loops about a pulley 36 fixed at the other end of the horizontal lower guide rail 26 to the output shaft of a drive motor 38. The opposite ends of the drive belt 35 are fixed on the opposite sides of the slider 24. A connection rod 37 is connected between the pulleys 33 and 36 to transmit a drive from the drive motor 38 to the pulley 33.

Referring to FIGS. 3 to 7, the tape cassette carrier 20 is shown to include a tape cassette holder 40 formed in its one side surface with a rectangular cassette port 41 through which a tape cassette 15 is placed into and out of the tape cassette holder 40. The tape cassette holder 40 is supported, through two shafts 42 fixed on the opposite sides thereof, on a U-shaped frame member 43 for free rotation about its longitudinal axis B (FIG. 3) with respect to the frame member 43. The frame member 43 is secured on a shaft 44 for free rotation about the axis A of the shaft 44. The shaft 44 is rigidly fixed on a base member 45 which in turn is carried on the slider 21. Thus, the tape cassette holder 40 can rotate about the axis A and also about the axis B with respect to the base member 45.

To produce the rotation of the tape cassette holder 40 about the axis A with respect to the slider 21, the fixed shaft 44 has a spur gear 50 fixed thereon for rotation in unison therewith. The spur gear 50 is drivingly connected through a reduction gear train to a worm gear 56 fixed on the output shaft of a drive motor 57. The drive motor 57 is carried on the frame member 43. The reduction gear train includes gears 51, 52, 53, 54 and 55 carried on the frame member 43. The gear 51, which is held in meshing engagement with the spur gear 50, revolves around the spur gear 50 like a planetary gear to rotate the frame member 43, along with the tape cassette holder 40 about the axis A with respect to the slider 21, from the position illustrated in FIG. 6 to the position illustrated in FIG. 7 or from the position illustrated in FIG. 7 to the position illustrated in FIG. 6 when a drive is transmitted from the drive motor 57.

The spur gear 50 has a disc member 61 secured on one side of thereof. The disc member 61 is formed in its peripheral surface with a roller guide surface 62 which has two concave depressions 63 and 64 circumferentially spaced at an angle of 90°. A swing lever 65, which is pivoted on the frame member 43, is provided at its tip end with a roller 66. A spring 67 is provided to urge the swing lever 65 in a direction holding the roller 66 in pressure contact with the roller guide surface 62. When the tape cassette holder 40 is in the vertical posture shown in FIG. 6, the roller 66 is in engagement with the concave depression 63 to limit frame member rotation. This position is sensed by a position sensor 68 provided on the frame member 43. When the tape cassette holder 40 rotates from the vertical posture shown in FIG. 6 to the horizontal posture shown in FIG. 7, the lever 65 moves against the resilient force of the spring 67 to bring the roller 66 along the roller guide surface 62 into engagement with the concave depression 64 where frame member rotation is limited. This position is also sensed by the position sensor 68.

To produce the rotation of the tape cassette holder 40 about the axis B with respect to the slider 21, one of the fixed shafts 42 has a spur gear 70 fixed thereon for rotation in unison therewith. The spur gear 70 is drivingly connected through a reduction gear train to a worm gear 76 fixed on the output shaft of a drive motor 77. The drive motor 77 is carried on the frame member 43. The reduction gear train includes gears 71, 72, 73, 74 and 75 carried on the frame member 43. The spur gear 70, which is held in meshing engagement with the spur gear 71, revolves around the gear 71 like a planetary gear to rotate the tape cassette holder 40 about the axis B with respect to the frame member 43, from the position illustrated in FIG. 8 to the position illustrated in FIG. 9 or from the position illustrated in FIG. 9 to the position illustrated in FIG. 8 when a drive is transmitted from the drive motor 77.

The spur gear 70 has a disc member 81 secured on one side of thereof. The disc member 81 is formed in its peripheral surface with a roller guide surface 82 which has three concave depressions 83a, 83b and 83c equally spaced circumferentially at angles of 90°. A swing lever 85, which is pivoted on the frame member 43, is provided at its tip end with a roller 86. A spring 87 is provided to urge the swing lever 85 in a direction holding the roller 86 in pressure contact with the roller guide surface 82. When the tape cassette holder 40 is in the vertical posture shown in FIG. 6, the roller 86 is in engagement with the concave depression 83b to limit the rotation of the tape cassette holder 40. When the tape cassette holder 40 rotates in a clockwise direction, as viewed in FIG. 5, from the vertical posture shown in FIG. 6 to the vertical posture shown in FIG. 8, the roller 86 moves along the roller guide surface 82 into engagement with the concave depression 83b where the rotation of the tape cassette holder 40 is limited. When the tape cassette holder 40 rotates in the counter-clockwise direction, as viewed in FIG. 5, from the vertical posture shown in FIG. 6 to the vertical posture shown in FIG. 9, the roller 86 moves along the roller guide surface 82 into engagement with the concave depression 83c where the rotation of the tape cassette holder 40 is limited. A position sensor 88 is provided on the tape cassette holder 40 and produces a corresponding signal when the roller 86 comes into engagement with concave depression 83a, 83b or 83c.

Figure 8:
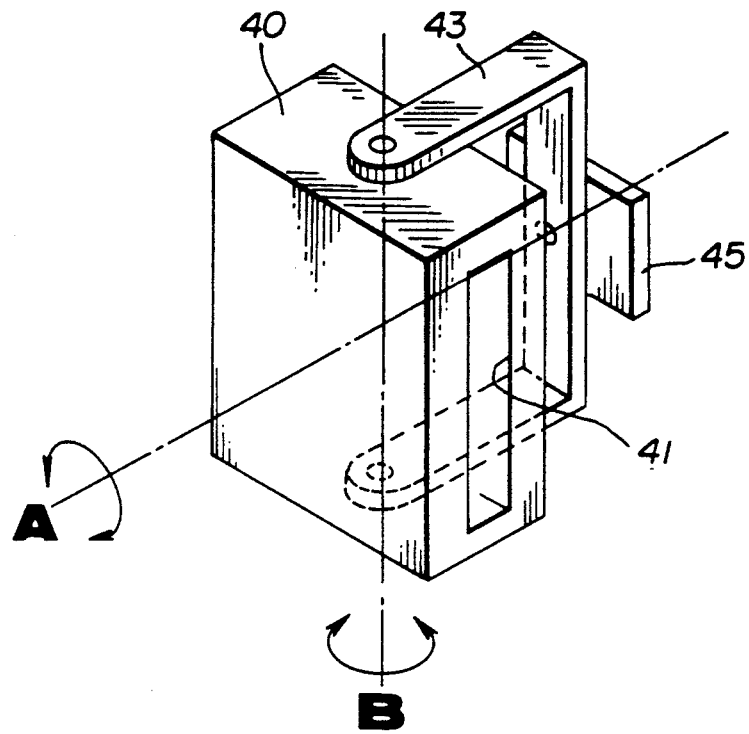
FIG. 8 is an enlarged perspective view of the tape cassette holder placed in its rightward facing vertical posture.
Figure 9:
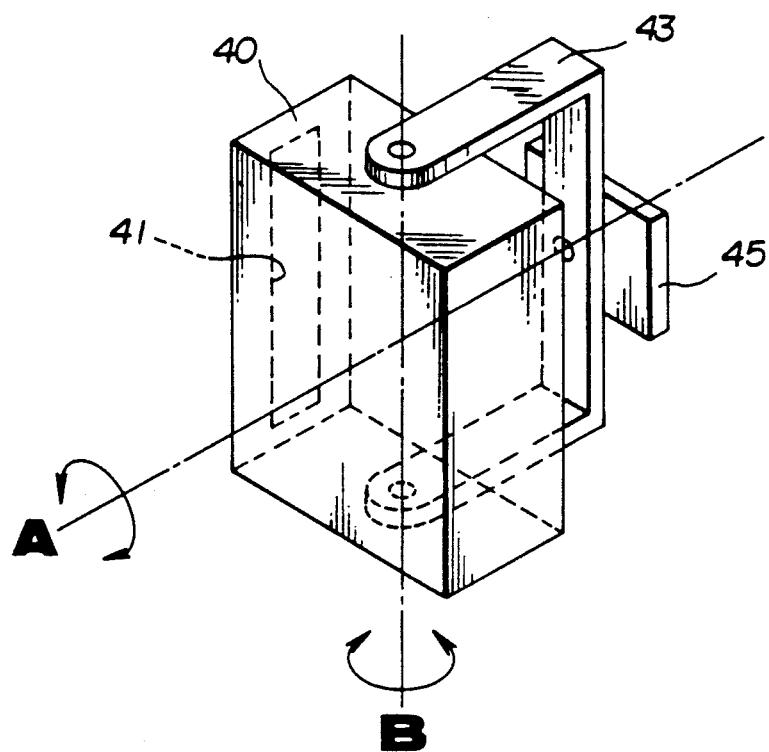
FIG. 9 is an enlarged perspective view of the tape cassette holder placed in its leftward facing vertical posture.

The operation of the tape cassette autochanger of the invention will now be described. When the tape cassette carrier 20 is in a desired position as indicated by the broken lines of FIGS. 1 and 2, the control unit (not shown) produces a command operating the drive motor 77 to rotate the tape cassette holder 40 in a direction about the axis B so as to bring its cassette port 41 into registry with the cassette port 14 through which a desired tape cassette 15 is transferred into the tape cassette holder 40. The sensor 78 detects the arrival of the tape cassette holder 40 at this position, as shown in FIG. 8 or 9, and causes the control unit to stop the drive motor 77. A known tape cassette transfer mechanism (not shown) may be used to transfer the tape cassette 15 into the tape cassette holder 40. After the desired tape cassette 15 is placed in the tape cassette holder 40, the control unit produces a command operating the drive motor 77 to rotate the tape cassette holder 40 in the opposite direction about the axis B to its initial position. The sensor 78 detects the arrival of the tape cassette holder 40 at its initial position, as shown in FIG. 6, and causes the control unit to stop the drive motor 77.

Thereafter, the control unit produces a command operating the drive motors 30 and 38 to move the tape cassette holder 40 toward a desired tape recorder/player unit 18. When the tape cassette holder 40 arrives at a desired position, the control unit produces a command operating the drive motor 57 to rotate the tape cassette holder 40 about the axis A from the vertical posture as shown in FIG. 6 into the horizontal posture as shown in FIG. 7 so that the cassette port 41 comes into registry with the cassette port 19 of the desired tape recorder/player unit 18. The sensor 68 detects the arrival of the tape cassette holder 40 at this position and causes the control unit to stop the drive motor 57. The tape cassette holder 40 may employ a tape cassette transfer mechanism to load the tape cassette 15 from the tape cassette holder 40 into the tape recorder/player unit 18.

Figure 6:
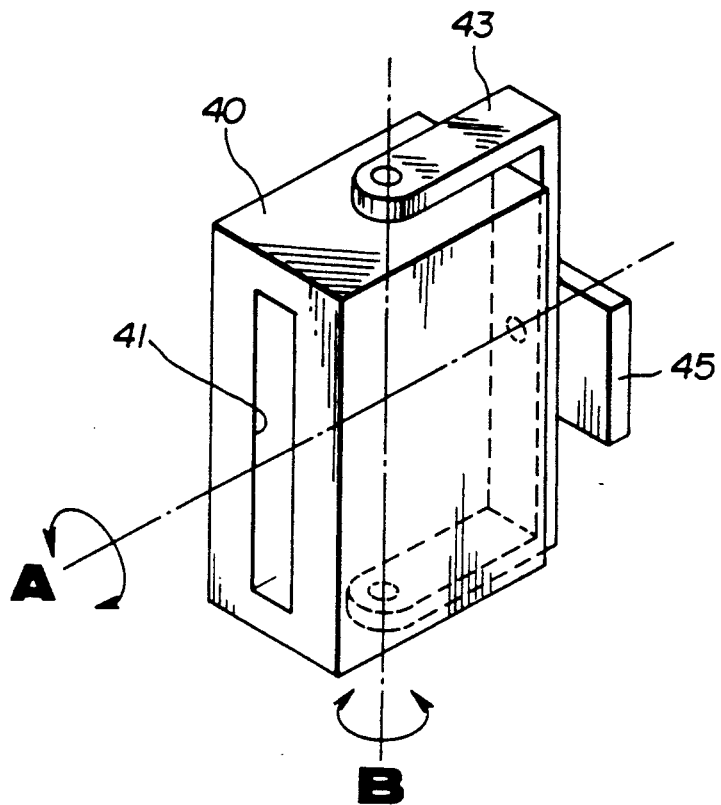
FIG. 6 is an enlarged perspective view of the tape cassette holder placed in its central vertical posture.
Figure 7:
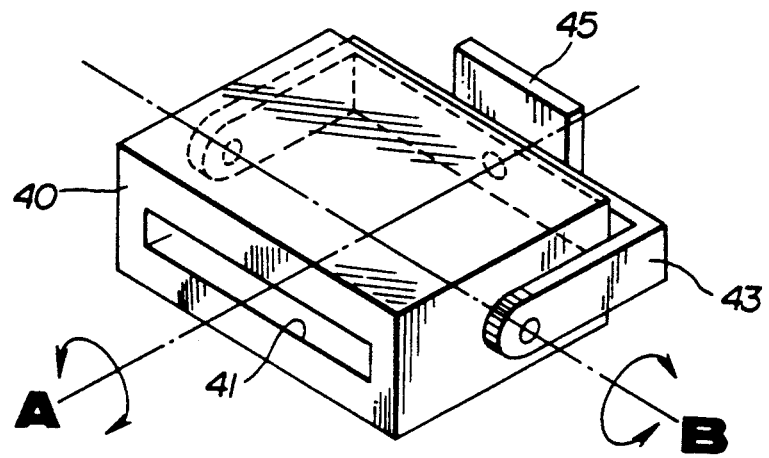
FIG. 7 is an enlarged perspective view of the tape cassette holder placed in its horizontal posture.

After the tape cassette 15 is transferred from the tape recorder/player unit 18 into the tape cassette holder 40, the control unit produces a command operating the drive motor 57 to rotate the tape cassette holder 40 about the axis A from the horizontal posture as shown in FIG. 7 into the vertical posture as shown in FIG. 6. The sensor 68 detects the arrival of the tape cassette holder 40 at this position and causes the control unit to stop the drive motor 57. Then, the control unit produces a command operating the drive motors 30 and 38 to move the tape cassette holder 40 toward the initial position as indicated by the broken lines of FIGS. 1 and 2. Thereafter, the control unit produces a command operating the drive motor 77 to rotate the tape cassette carrier 40 about the axis B so as to bring its cassette port 41 into registry with the cassette port 14. The sensor 78 detects the arrival of the tape cassette holder 40 at this position and causes the control unit to stop the driver motor 77. The tape cassette transfer mechanism operates to transfer the tape cassette 15 from the tape cassette holder 40 into the initial position of the tape cassette container.

Figure 10:
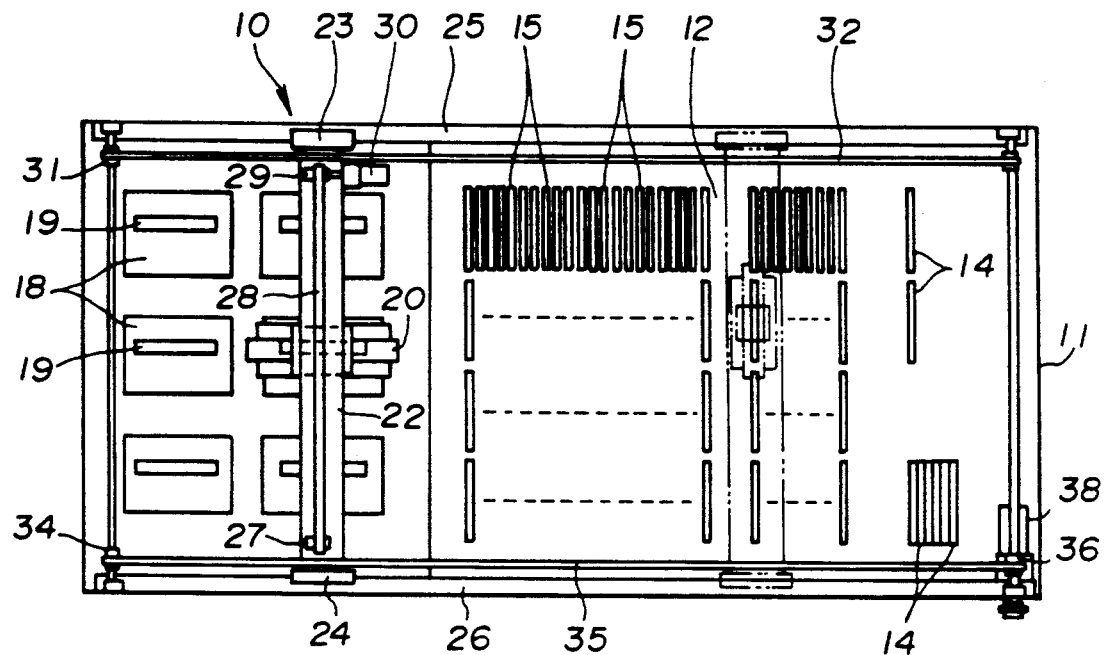
FIG. 10 is an elevational view showing a second embodiment of the cassette autochanger of the invention.
Figure 11:
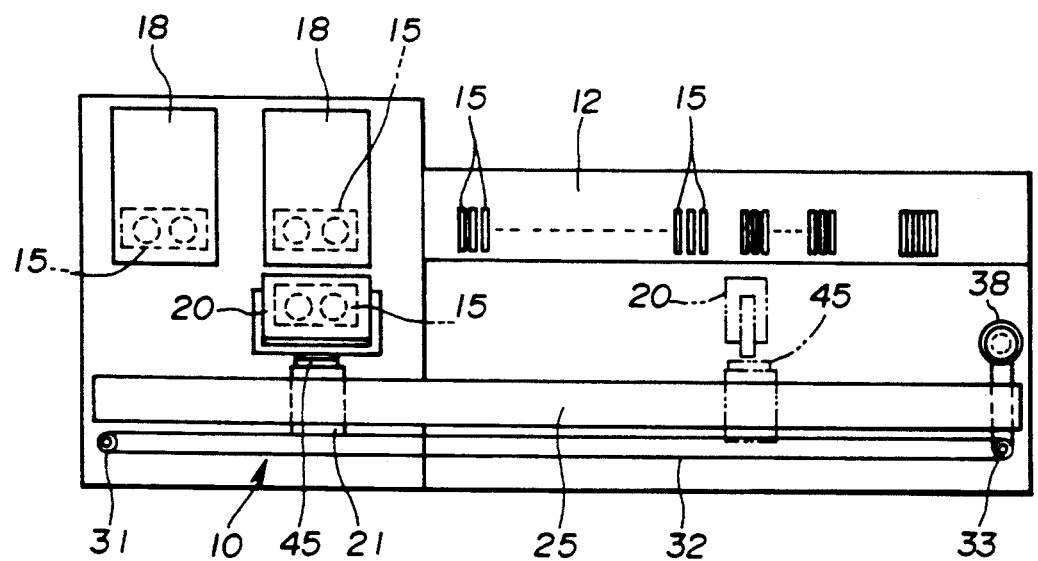
FIG. 11 is a plan view of the cassette autochanger of FIG. 10.

Referring to FIGS. 10 and 11, there is shown a second embodiment of the tape cassette autochanger of the invention. Like reference numerals have been applied to FIGS. 10 and 11 with respect to the equivalent components shown in FIGS. 1 to 3. In this embodiment, the housing 11 contains only one tape cassette container 12. The tape recorder/player units 18 are arranged to have the respective cassette ports 19 opening in the same direction as the cassette ports 14 of the tape cassette container 12. The tape cassette carrier 20 is substantially the same as shown and described in connection with the first embodiment except that the components 70 to 88 used in the first embodiment for rotating the tape cassette holder 40 about the axis B (FIG. 3) are removed with the tape cassette holder 40 being fixed to the frame member 43 so as to permit rotation of the tape cassette holder 40 about the axis A only between its vertical posture as shown in FIG. 12 and its horizontal posture as shown in FIG. 13.

The operation of the tape cassette autochanger as shown in FIGS. 10 and 11 is as follows: When the tape cassette carrier 20 is in position with the cassette port 41 in the holder being in registry with the cassette port 14 for a desired tape cassette 15, as indicated by the broken lines of FIGS. 10 and 11, the control unit (not shown) produces a command operating a tape cassette transfer mechanism (not shown) to transfer the desired tape cassette 15 from the tape cassette container 12 into the tape cassette holder 40. After the desired tape cassette 15 is placed in the tape cassette holder 40, the control unit produces a command operating the drive motors 30 and 38 to move the tape cassette holder 40 toward a desired tape recorder/player unit 18. When the tape cassette holder 40 arrives at a desired position, the control unit produces a command operating the drive motor 57 to rotate the tape cassette holder 40 about the axis A from the vertical posture as shown in FIG. 12 into the horizontal posture as shown in FIG. 13 so that the cassette port 41 comes into registry with the cassette port 19 of the desired tape recorder/player unit 18. The sensor 68 detects the arrival of the tape cassette holder 40 at this position and causes the control unit to stop the drive motor 57. A tape cassette transfer mechanism is used to load the tape cassette 15 from the tape cassette holder 40 into the tape recorder/player unit 18.

Figure 12:
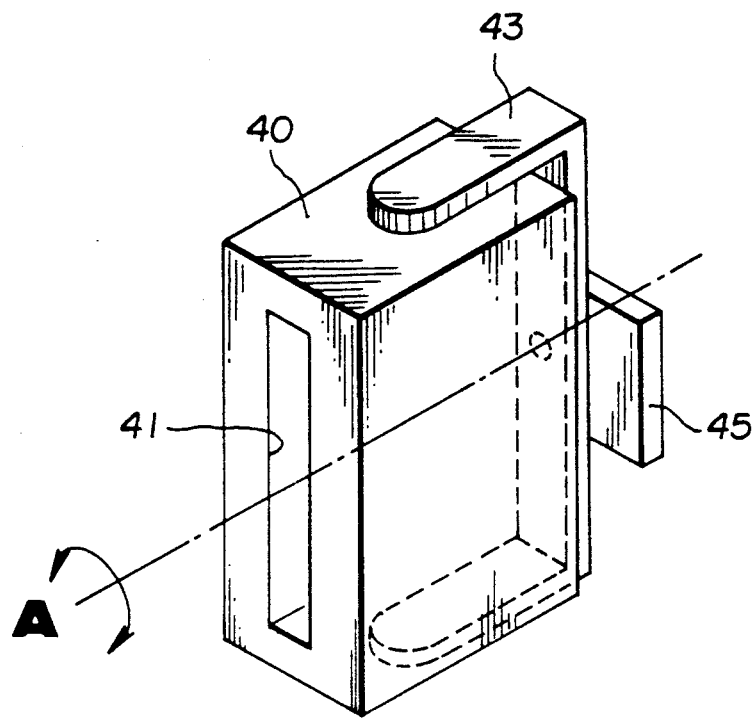
FIG. 12 is an enlarged perspective view showing the tape cassette holder placed in its vertical posture.
Figure 13:
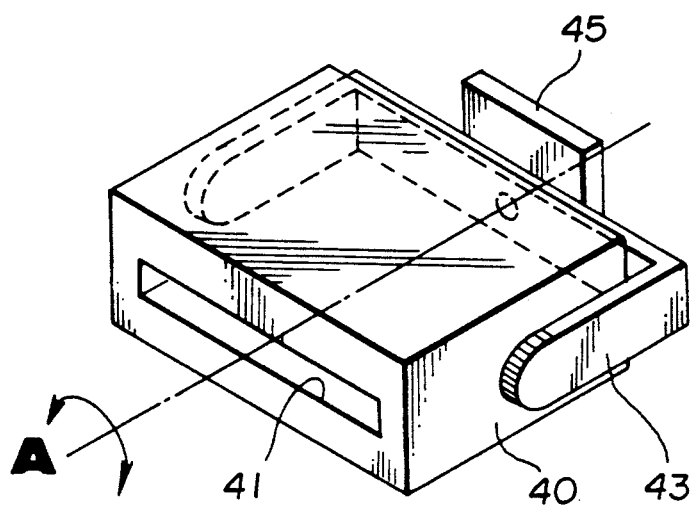
FIG. 13 is an enlarged perspective view showing the tape cassette holder placed in its horizontal posture.

After the tape cassette 15 is transferred from the tape recorder/player unit 18 into the tape cassette holder 40, the control unit produces a command operating the drive motor 57 to rotate the tape cassette holder 40 about the axis A from the horizontal posture as shown in FIG. 13 into the vertical posture as shown in FIG. 12. The sensor 68 detects the arrival of the tape cassette holder 40 at this position and causes the control unit to stop the drive motor 57. Then, the control unit produces a command operating the drive motors 30 and 38 to move the tape cassette holder 40 toward the initial position as indicated by the broken lines of FIG. 10 and 11. Thereafter, the tape cassette transfer mechanism operates to transfer the tape cassette 15 from the tape cassette holder 40 into the initial position of the tape cassette container 12.

Figure 14:
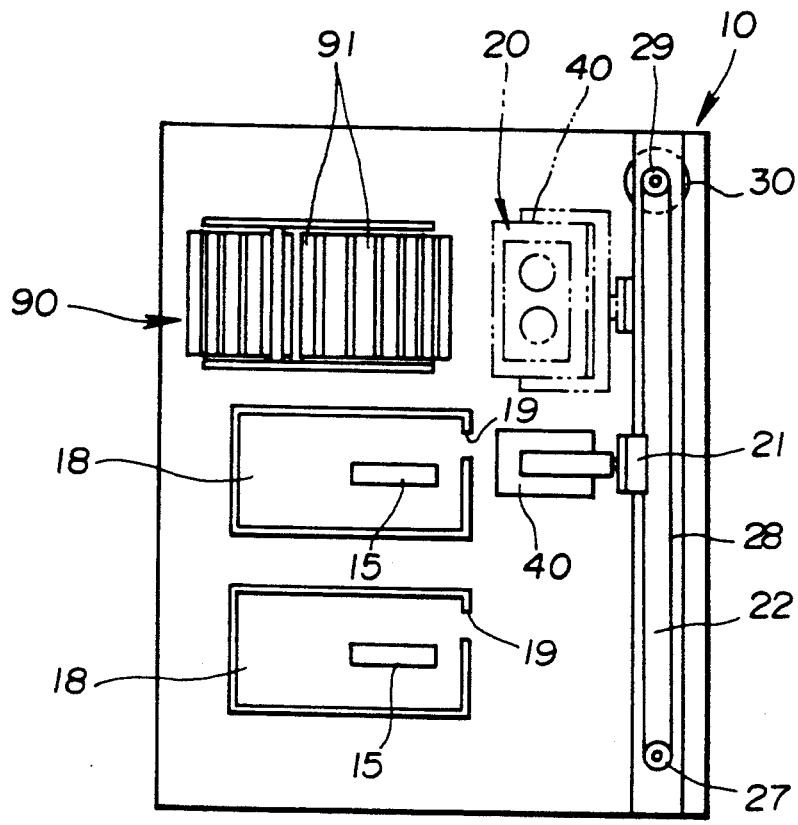
FIG. 14 is a side view showing a third embodiment of the cassette autochanger of the invention.
Figure 15:
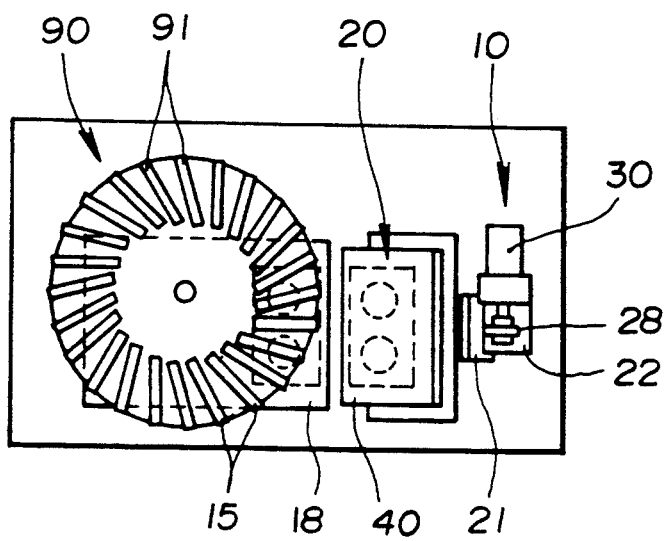
FIG. 15 is a plan view of the cassette autochanger of FIG. 14.

Referring to FIGS. 14 and 15, there is shown a third embodiment of the tape cassette autochanger of the invention. Like reference numerals have been applied to FIGS. 14 and 15 with respect to the equivalent components shown in FIGS. 1 to 3. In this embodiment, the housing 11 contains a cylindrical tape cassette container 90 having a number of tape cassettes 15 placed in a vertical posture within the tape cassette container. The cylindrical tape cassette container 90 is formed in its peripheral surface with a number of vertically elongated rectangular cassette ports 91 equally spaced circumferentially. The tape recorder/player units 18 are arranged below or above the cylindrical tape cassette container 90 to have the respective cassette ports 19 opening in the same direction. The tape cassette carrier 20 is substantially the same as shown and described in connection with the first embodiment except that the components 70 to 88 used in the first embodiment for rotating the tape cassette holder 40 about the axis B (FIG. 3) are removed with the tape cassette holder 40 being fixed to the frame member 43 so as to permit rotation of the tape cassette holder 40 about the axis A (FIG. 3) only between its vertical posture and its horizontal posture. Furthermore, the horizontal guide rails 25 and 26 and the associated components are removed.

The operation of the tape cassette autochanger as shown in FIGS. 14 and 15 is as follows: A container rotating mechanism (not shown) is used to rotate the cylindrical tape cassette container 90 so as to bring a desired cassette port 91 in registry with the cassette port 41 in the holder of the tape cassette carrier 20, as indicated by the broken lines of FIG. 14. The control unit (not shown) produces a command operating a tape cassette transfer mechanism (not shown) to transfer the desired tape cassette 15 from the tape cassette container 90 into the tape cassette holder 40. After the desired tape cassette 15 is placed in the tape cassette holder 40, the control unit produces a command operating the drive motor 30 to move the tape cassette holder 40 in the vertical direction toward a desired tape recorder/player unit 18. When the tape cassette holder 40 arrives at a desired position, the control unit produces a command operating the drive motor 57 to rotate the tape cassette holder 40 about the axis A from the vertical posture into the horizontal posture so that the cassette port 41 comes into registry with the cassette port 19 of the desired tape recorder/player unit 18. The sensor 68 detects the arrival of the tape cassette holder 40 at this position and causes the control unit to stop the drive motor 57. A tape cassette transfer mechanism is used to load the tape cassette 15 from the tape cassette holder 40 into the tape recorder/player unit 18.

After the tape cassette 15 is transferred from the tape recorder/player unit 18 into the tape cassette holder 40, the control unit produces a command operating the drive motor 57 to rotate the tape cassette holder 40 about the axis A from the horizontal posture into the vertical posture. The sensor 68 detects the arrival of the tape cassette holder 40 at this position and causes the control unit to stop the drive motor 57. Then, the control unit produces a command operating the drive motor 30 to move the tape cassette holder 40 toward the initial position as indicated by the broken lines of FIG. 14. Thereafter, the tape cassette transfer mechanism operates to transfer the tape cassette 15 from the tape cassette holder 40 into the initial position of the cylindrical tape cassette container 90.

Although the invention has been described in connection with video tape cassettes, it is to be understood that the invention is equally applicable to other kinds of tape cassettes and discs.

While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. A cassette autochanger comprising:
   at least first and second cassette containers which are differently oriented and which each contain a respective plurality of cassettes placed therein in a vertical posture and each having a medium with a signal recorded thereon;
   at least one reproducing unit for reproducing the signal recorded on the medium of one of said cassettes placed in a horizontal posture in said reproducing unit;
   a cassette holder rotatable about a first axis between vertical and horizontal postures and about a second axis substantially normal to said first axis between at least first and second orientations corresponding to the differently oriented first and second cassette containers, respectively; and
   a carrying device for carrying said cassette holder between said cassette containers and said reproducing unit, said carrying device including selectively operable means for rotating said cassette holder about said first and second axis so as to dispose said cassette holder in said vertical posture in a selected one of said first and second orientations to permit said cassette holder to receive a selected one of said cassettes from said first or second cassette container or to transfer the selected cassette into said first or second cassette container, or so as to dispose said cassette holder in said horizontal posture for transferring the selected cassette into said reproducing unit or for receiving the selected cassette from said reproducing unit.

2. A cassette autochanger as in claim 1; in which said reproducing unit has an orientation different from the orientations of said first and second cassette containers, said cassette holder is rotatable about said second axis to a third orientation corresponding to said orientation of said reproducing unit, and said carrying device disposes said cassette holder in said third orientation when in said horizontal posture for transferring the selected cassette into said reproducing unit or for receiving said selected cassette from said reproducing unit.

3. A cassette autochanger as in claim 2; in which said third orientation is between said first and second orientations, said first and second cassette containers are arranged in parallel, spaced apart relation at opposite sides of a space therebetween and have cassette receiving compartments with openings into said space, said cassette holder is movable in said space and has an opening communicating with the opening of a selected one of said compartments of said first or second cassette container when said holder is in said vertical posture and in said first or second orientation, respectively, and said reproducing unit is disposed between said first and second cassette containers and has an opening communicating with said opening of the cassette holder when the latter is in said horizontal posture and said third orientation.

4. A cassette autochanger comprising:
   at least one cassette container for containing a plurality of cassettes placed therein in a vertical posture and each having a medium on which a signal is recorded;
   at least one reproducing unit for reproducing the signal recorded on the medium of one of said cassettes placed therein in a horizontal posture, said reproducing unit having an orientation different from an orientation of at least said one cassette container;
   a cassette holder rotatable about a first axis between vertical and horizontal postures and about a second axis substantially normal to said first axis between first and second orientations corresponding to said orientation of said one cassette container and said orientation of said reproducing unit, respectively, for receiving a selected one of said cassettes into said cassette holder from said cassette container and transferring the selected cassette therefrom into said cassette container when said cassette holder is in said vertical posture and said first orientation, and for transferring the selected cassette from said cassette holder to said reproducing unit and receiving the selected cassette therefrom when said cassette holder is in said horizontal posture and said second orientation; and a carrying device for carrying said cassette holder between said cassette container and said reproducing unit, said carrying device including means for rotating said cassette holder about said first axis from the horizontal posture into the vertical posture and about said second axis from said second orientation to said first orientation to permit said cassette holder to receive the selected cassette from said cassette container or transfer the selected cassette into said cassette container and for rotating said cassette holder about said first axis from the vertical posture into the horizontal posture and about said second axis from said first orientation to said second orientation to permit said cassette holder to receive the selected cassette from said reproducing unit or transfer the selected-cassette into said reproducing unit.

5. A cassette autochanger comprising:

two cassette containers in spaced-parallel relationship for each containing a respective plurality of cassettes placed in a vertical posture, each of said cassettes having a medium on which a signal is recorded;

at least one reproducing unit for reproducing the signal recorded on the medium of one of said cassettes placed therein in a horizontal posture;

a cassette holder movable between vertical and horizontal postures for receiving a selected one of said cassettes thereinto from one of said cassette containers or from said reproducing unit and for transferring the selected cassette therefrom into one of said cassette containers or into said reproducing unit; and a carrying device for carrying said cassette holder between said cassette containers and said reproducing unit, said carrying device including means for rotating said cassette holder about a first axis from the horizontal posture into the vertical posture to permit said cassette holder to receive the selected cassette from said one of the cassette containers or to transfer the selected cassette into said cassette container and for rotating said cassette holder about said first axis from the vertical posture into the horizontal posture to permit said cassette holder to receive the selected cassette from said reproducing unit or transfer the selected cassette into said reproducing unit, said cassette holder being rotatable about a second axis substantially normal to said first axis, and said carrying device further including means for rotating said cassette holder around said second axis to a first position permitting said cassette holder to receive the selected cassette from the first one of said cassette containers or to transfer the selected cassette into said first cassette container and to a second position permitting said cassette holder to receive the selected cassette from the second one of the cassette containers or to transfer the selected cassette into said second cassette container.

6. A cassette autochanger according to claim 5, wherein said carrying device includes an electric motor operable for rotating said cassette holder about said second axis, means for producing a first signal when said cassette holder arrives at said first position and a second signal when said cassette holder arrives at said second position, and means responsive to said first or second signal for stopping said electric motor.

* * * * *